United States Patent [19] [11] Patent Number: 6,076,629
Tengham [45] Date of Patent: *Jun. 20, 2000

[54] LOW FREQUENCY FLEXTENSIONAL ACOUSTIC SOURCE FOR UNDERWATER USE

[75] Inventor: Rune Tengham, Västerås, Sweden

[73] Assignee: Unaco Systems AB, Vasteras, Sweden

[*] Notice: This patent is subject to a terminal disclaimer.

[21] Appl. No.: 09/171,248

[22] PCT Filed: Mar. 5, 1997

[86] PCT No.: PCT/NO97/00064

§ 371 Date: Oct. 8, 1998

§ 102(e) Date: Oct. 8, 1998

[87] PCT Pub. No.: WO97/41454

PCT Pub. Date: Nov. 6, 1997

[30] Foreign Application Priority Data

Apr. 30, 1996 [NO] Norway .................................. 961765

[51] Int. Cl.[7] ...................................................... G01V 1/40
[52] U.S. Cl. .......................... 181/102; 181/102; 181/101; 181/108; 181/110; 181/117; 181/113; 181/119; 181/120; 367/155; 367/157; 367/158; 367/160; 367/161; 367/168; 367/153; 367/159; 367/140; 367/141
[58] Field of Search ..................................... 181/101, 108, 181/110, 117, 102, 113, 119, 120; 367/155, 157, 158, 160, 161, 163, 168, 153, 159, 140, 141, 165, 162, 167, 172, 173, 174, 188; 310/26, 334, 337, 354

[56] References Cited

U.S. PATENT DOCUMENTS

| | | | |
|---|---|---|---|
| 4,706,230 | 11/1987 | Inoue et al. | 367/174 |
| 4,763,307 | 8/1988 | Massa | 367/174 |
| 4,764,907 | 8/1988 | Dahlstrom et al. | 367/163 |
| 4,862,429 | 8/1989 | Rolt | 367/165 |
| 4,894,811 | 1/1990 | Porzio | 367/174 |
| 4,932,008 | 6/1990 | Rolt | 367/165 |
| 4,941,202 | 7/1990 | Upton | 367/165 |
| 5,126,979 | 6/1992 | Rowe, Jr. et al. | 367/175 |
| 5,375,101 | 12/1994 | Wolfe et al. | 367/175 |
| 5,515,343 | 5/1996 | Boucher et al. | 367/158 |
| 5,546,361 | 8/1996 | Boucher et al. | 367/158 |

FOREIGN PATENT DOCUMENTS

WO 94/22036  9/1994  WIPO .
WO 96/36888  11/1996  WIPO .

OTHER PUBLICATIONS

Brigham, G. and Glass, B.: Present Status in Flextensional Transducer Technology. J. Acoust. Soc. Am., vol. 68, No. 4, Oct. 1980.

Primary Examiner—Stanley J. Witkowski
Assistant Examiner—Edgardo San Martin
Attorney, Agent, or Firm—Arnold & Associates

[57] ABSTRACT

There is provided an acoustic source especially for use in seismic studies at sea. The acoustic source has a longitudinal axis and sound emitting surfaces adapted to be put into sound emitting movements towards and away from each other by use of a drive unit. The sound emitting surfaces comprise two curved plate members having upper and lower ends essentially symmetrically positioned in relation to the longitudinal axis of the acoustic source, and forming a convex cross section with their respective upper and lower edges converging towards each other. The upper and lower edges of the sound emitting surfaces, respectively, are connected to each other with two corresponding side elements, the side elements each being connected to at least one hinge stretching along at least a part of the length of the source. The acoustic source further comprises a rigid frame for supporting the drive unit and comprising at least two rigid slide rods slidingly attached to the side elements with slide bearings for permitting relative axial movement of the slide rods with respect to the side elements. Hinges connected to the side elements provide a direct connection between the upper and lower edges, respectively, of the sound emitting surfaces.

7 Claims, 2 Drawing Sheets

LOW FREQUENCY FLEXTENSIONAL ACOUSTIC SOURCE FOR UNDERWATER USE

This invention relates in general to acoustic sources for the generation of soundwaves in water, especially soundwaves with low frequencies, e.g. for use in seismic studies at sea. Such sources, being used in generating soundwaves in water, may be described in different ways, such as seismic emitters, flextensional sources or acoustic vibrators, such as sonars.

The acoustic source according to the invention may preferably be used in relation to such sound- or tone-emitters, since the soundwaves emitted into the water may be reflected from the sea bottom and geological formations beneath it, with succeeding monitoring and detection using hydrophones or geophones of different types.

The invention is especially aimed at a certain embodiment of sound emitting membranes or shells in acoustic sources, and the present embodiment may be considered to be related to certain types of flextensional emitters.

Flextensional emitters are described in many publications, one example being L. H. Royster: "The flextensional concept. A new approach to the design of underwater acoustic transducers", Appl.Acoust. 3 (1970), pp 117–226. Other examples are G. Bromfield: "Class IV flextensional transducers", Proceedings Second International Workshop on Power Transducers, Toulon, (France) June 1990, and G. Brigham and B. Glass: "Present status in flextensional transducer technology", J. Acoust. Soc. A., 68(1980), pp. 1046–1052.

Most flextensional shells are based on the principle of changes in volume in a vibrating, elliptic shell. When the long axis of an ellipse is set into vibration the length of the short axis will also vibrate, but with a much larger amplitude. This makes the ellipse shape an effective generator of acoustic energy at low frequencies. Generally the basic resonance frequency of the elliptic shell is so low that the length of the shell is small when compared to the wavelength in water.

A limiting factor for this kind of shells are the mechanical tensions forced upon the shell when large vibrational amplitudes are to be obtained. Normally aluminum or glass-fibre armed plastic is used as shell material. The use of such shells are also limited as a result of their complex shape, which lead to complicated manufacturing methods.

A special example of a complicated shape, being visually and functionally different from the abovementioned elliptic, round shells (egg-shaped), are hyperbolic, round shells. The advantage with this shape is that the short axis will vibrate in face with the long axis. An embodiment based on this principle is described in D. F. Jones and C. G. Reithmeier: "Low frequency barrel-stave projectors" (Proceedings UDT 93, Nice, France, Microwave Exh. & Pub. Ltd. 1993, pp 251–253).

This last embodiment comprises in short two octagonal end plates joined together with eight rod-shaped elements having a concave curvature and being positioned in an essentially circular or polygonal arrangement surrounding an axis of symmetry. A major problem with this design is the many slits between the rod elements, and the question of sealing and possible contact between these elements.

In Norwegian patent application no. 94.1708 (corresponding to International patent application no. PCT/NO95/00071) an acoustic source is described with sound emitting surfaces having a generally concave shape and being adapted to be set into vibrational movement using a drive assembly affecting the sound emitting surfaces through at least one pressure element and two platelike end parts being connected to the sound emitting surfaces. The novelty of this invention is primarily related to the fact that the sound emitting surfaces are formed by two curved membrane-like plate members having width and height dimensions of comparable sizes and being mounted back-to-back, that the plate-like end pieces have essentially rectangular shapes with a first pair of opposite side edges connected to the end parts of the plate members, and that another pair of side edges on each end piece, as well as the side edges of the plate members are connected to two side pieces which close the acoustic source on each side, preferably in a sealing way.

An object of this invention is to provide an improved acoustic source, which through a simple and suitable embodiment provides a dependable and reliable source unit, at the same time having a high acoustic efficiency.

On the basis of the mentioned prior art this invention is thus based on an acoustic source primarily for use in seismic studies at sea, with sound emitting surfaces adapted to be put into sound emitting movement to and from each other using a drive unit in a per se known way.

The new and inventive features according to this invention is that the sound emitting surfaces are formed by two curved plate members essentially symmetrically positioned in relation to the axis of the source forming a convex cross section with the upper and the lower edges converging towards each other, that the source comprises a rigid frame, preferably for supporting the drive unit, comprising at least two slide rods being loosely attached to the side elements with slide bearings or similar devices to give the side elements a possibility for movement to and from each other, and that the upper and the lower edges of the sound emitting surfaces, respectively, are connected to each other with two side elements, the side elements each comprising at least one hinge or a corresponding, flexible connection, stretching along at least a part of the length of the source.

The invention is in the following described with reference to the accompanying drawings, in which.

Figure 1:
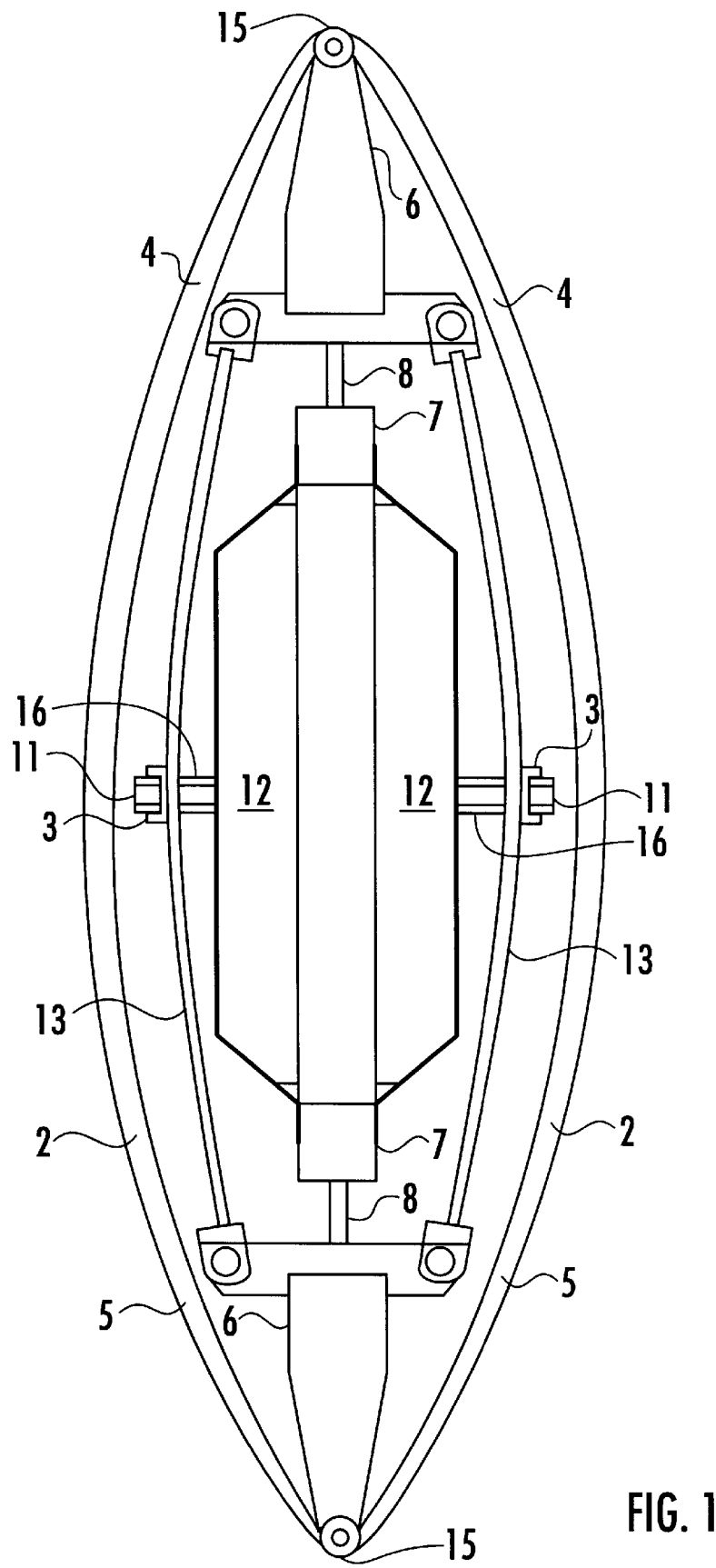
FIG. 1 shows a section of one embodiment of an acoustic source according to the invention.

FIG. 1 shows a first embodiment of the invention with an essentially round cross section comprising sound emitting surfaces 2 being in their respective upper 4 and lower 5 edges flexibly connected to through hinges 15. When the side elements 6 are pulled towards and away from each other using the drive unit 3,12,13 the sound emitting surfaces 2 are accordingly pushed away from and towards each other, thus generating a pressure wave which may propagate through water. Normally the side elements 6 in an elliptically shaped acoustic source with the shape shown in FIG. 1 will generate acoustic waves having a face that is opposite the face of the acoustic waves from the sound emitting surfaces 2. To prevent this, and at the same time obtain a compact form, the surface of the side elements 6 is made as small as possible. The side elements 6 connect at their outer ends to one or more hinges 15 connecting the upper 4 and the lower 5 edges of the sound emitting surfaces 2, respectively.

Preferably the hinges 15 on the side elements 6 provide a direct coupling between the edges 4,5 of the sound emitting surfaces 2 so that the outer dimensions of the side elements 6 are as small as possible. It is also possible to design the side elements 6 to comprise two parallel hinges or lines of hinges, each providing a connection between one side element 6 and the upper 4 or lower 5 edge of each of the sound emitting surfaces.

The acoustic source comprises a drive unit 3,12,13 being capable of generating vibrational movements. This drive unit is mounted in a frame 7. The frame 7 is held in position inside the source using slide rods 8. Preferably the source also comprises additional slide rods 11 to lock the position of the frame 7 in the vertical direction. These may for example be fastened with slide bearings 12 to the outer parts of the drive unit 3. If other types of drive units are used these second slide rods 11 are mounted in suitable suspension points in relation to, but preferably not through, the sound emitting surfaces 2.

Figure 2:
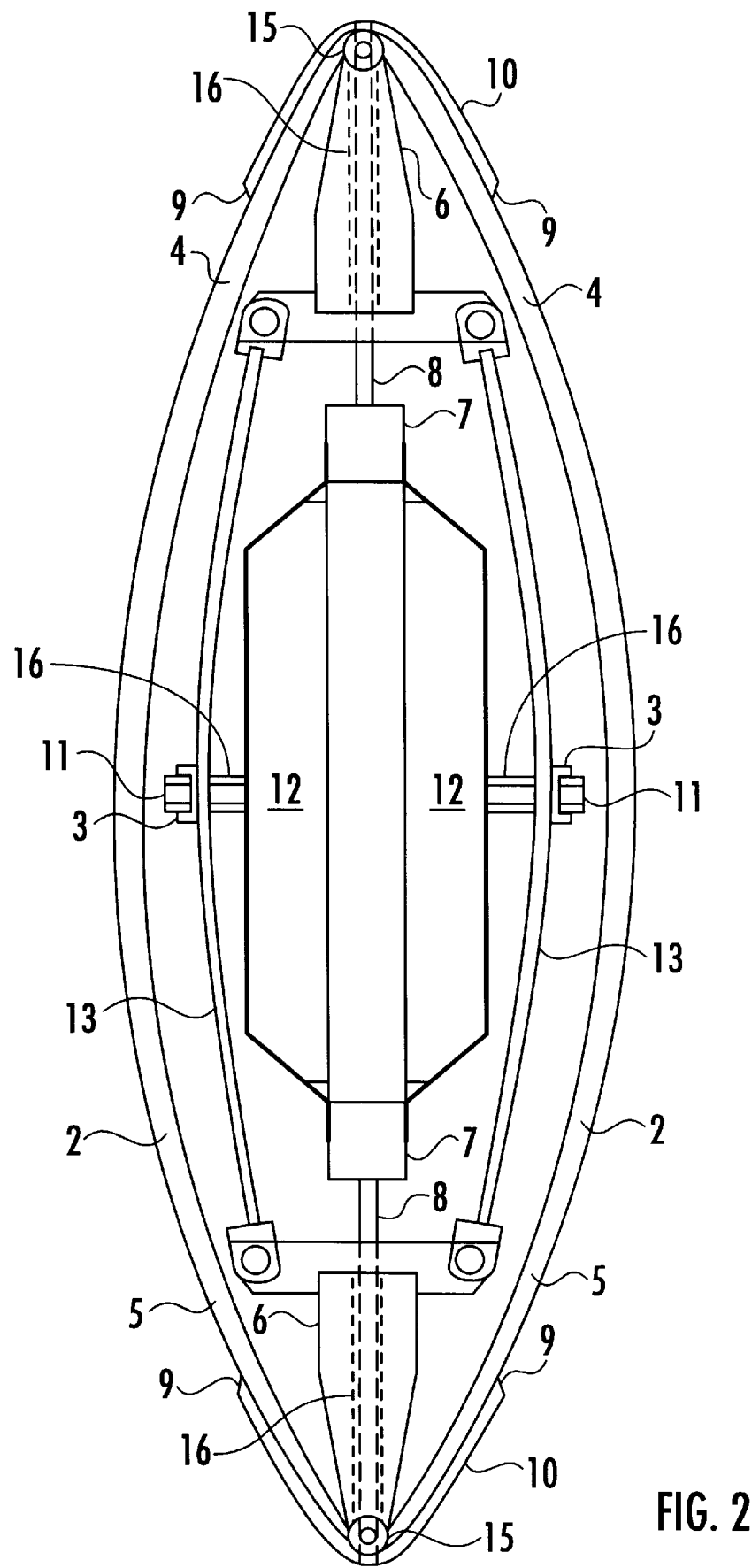
FIG. 2 shows a section of an alternative embodiment according to the invention.

In FIG. 2 an alternative embodiment is shown in which the acoustic source is provided with covers 10 covering the side elements 6. The slide rods 8 and the frame 7 keep a constant distance between covers 10. Slide bearings 16 extend through side elements 6. Slide rods 8 fit within slide bearings 16 so that slide rods 8 are slidingly connected to side elements 6. Alternatively, slide bearings 16 may be omitted and slide rods 8 tightly connected to side elements 6.

The covers 10 are preferably tightly mounted on the source, e.g. with sealing strips 9, so that the movements do not propagate into the surrounding water. Thus the signal from the sound emitting surfaces 2 is not distorted by the signals from the side elements 6.

The acoustic sources shown in the drawings are equipped with electrodynamic drive units. These are described in detail in Norwegian patent application no. 95.2605, (corresponding to International patent application no. PCT/NO96/00131). In short the drive units comprise pairs of electromagnetic and magnetic elements 3,12 being given a relative movement in relation to each other by applying a varying electric current. One of these parts 12 are mounted firmly in relation to a frame 7, and the other 3 is mounted on a transmission device 13. A movement of the second part 3 gives the transmission device 13 a movement which propagates to the side elements 6, which in turn moves the sound emitting surfaces 2. Other types of known drive units, for example based on electric rotation motors like the ones described in Norwegian patent application no. 95.1949 (corresponding to International patent application no. PCT/NO96/00119) or Norwegian patent no. 176.457 (corresponding to International patent application no. PCT/NO94/00057), may of course also be used.

The dimensions of the acoustic source in the longitudinal direction (not shown in the figures) will vary, depending on use, and is not important to the invention. The number of slide rods 8,11, and drive units 3,12,13 will depend on the length of the source.

What is claimed is:

1. Acoustic source having a longitudinal axis, especially for use in seismic studies at sea, with sound emitting surfaces adapted to be put into sound emitting movements towards and away from each other by use of a drive unit in which the sound emitting surfaces comprise two curved plate members having upper and lower ends essentially symmetrically positioned in relation to the longitudinal axis of the acoustic source, forming a convex cross section with their respective upper and lower edges converging towards each other, the upper and lower edges of the sound emitting surfaces, respectively, are connected to each other with two corresponding side elements, the side elements each being connected to at least one hinge stretching along at least a part of the length of the source, the acoustic source further comprising a rigid frame for supporting the drive unit, comprising at least two rigid slide rods being slidingly attached to the side elements with slide bearings, for permitting relative axial movement of the slide rods with respect to the side elements, wherein the hinges connected to the side elements provide a direct connection between the upper and lower edges, respectively, of the sound emitting surfaces.

2. Acoustic source according to claim 1, wherein the slide rods extend through the side elements, and in that covers are mounted over the upper and lower ends of the curved plate members of the sound emitting surfaces, thus providing covering surfaces having a constant distance between the covers.

3. Acoustic source according to claim 2, wherein the edges of the covers are sealed to provide a watertight contact between the covers and the rest of the source.

4. Acoustic source according to claim 3, wherein the covers comprise rubber.

5. Acoustic source according to claim 1, wherein the side elements comprise side plates.

6. Acoustic source according to claim 1, wherein the drive unit is an electromagnetic drive unit.

7. Acoustic source according to claim 1, wherein the frame also comprises slide bearings associated with the drive unit and at least two additional second slide rods, mounted essentially perpendicular to the longitudinal axis of the source and mounted in the slide bearings associated with the drive unit.

* * * * *

UNITED STATES PATENT AND TRADEMARK OFFICE
CERTIFICATE OF CORRECTION

PATENT NO : 6,076,629
DATED : June 20, 2000
INVENTOR(S) : Rune Tenghamn

It is certified that error appears in the above-identified patent and that said Letters Patent are hereby corrected as shown below:

On the first page of the patent, the inventor's name should read -- Rune Tenghamn --.

Column 2, Line 50, "flexibly connected to through hinges 15." should read -- flexibly connected to side elements 6 through hinges 15. --

Column 3, Line 11, "slide bearings 12 to the outer" should read -- slide bearings to the outer --.

Signed and Sealed this

Third Day of April, 2001

*Attest:*

NICHOLAS P. GODICI

*Attesting Officer*  *Acting Director of the United States Patent and Trademark Office*